United States Patent [19]

Brookfield

[11] Patent Number: 5,167,176
[45] Date of Patent: * Dec. 1, 1992

[54] TOOL HOLDING CIRCULAR TOOTHED BLADES STATIONARY WHILE CUTTING OR GROOVING ROTATING WORK

[76] Inventor: Richard A. Brookfield, 9625 Merrimoor Blvd., Largo, Fla. 33543

[*] Notice: The portion of the term of this patent subsequent to Sep. 3, 2008 has been disclaimed.

[21] Appl. No.: 762,388

[22] Filed: Sep. 19, 1991

[51] Int. Cl.⁵ .............................................. B23P 15/30
[52] U.S. Cl. ........................................ 82/159; 82/161; 407/64; 407/103; 407/78; 407/81
[58] Field of Search ................ 407/64, 117, 103-105, 407/113, 71, 74, 78, 90, 81; 82/158, 159, 160, 161

[56] References Cited

U.S. PATENT DOCUMENTS

| | | | |
|---|---|---|---|
| 349,475 | 9/1886 | Barclay | 407/64 |
| 2,520,205 | 8/1950 | Girardin | 407/117 X |
| 3,163,062 | 12/1964 | Schultz | 407/64 X |
| 3,182,534 | 5/1965 | Hoffmann | 407/64 X |
| 4,326,437 | 4/1982 | Fischer | 82/159 |
| 5,044,838 | 9/1991 | Brookfield | 407/103 |

FOREIGN PATENT DOCUMENTS

| | | | |
|---|---|---|---|
| 469890 | 12/1928 | Fed. Rep. of Germany | 82/158 |
| 3124666 | 1/1983 | Fed. Rep. of Germany | 407/117 |
| 3711240 | 10/1988 | Fed. Rep. of Germany | 82/159 |
| 21325 | of 0000 | Switzerland | 407/64 |
| 1193236 | 5/1970 | United Kingdom | 82/158 |

Primary Examiner—Larry I. Schwartz
Assistant Examiner—Kevin J. Carroll

[57] ABSTRACT

A tool for use with a tool holder has a body to which at least one blade such as a circular saw blade or milling cutter is clamped to prevent the blade from turning when a selected tooth is brought into cutting or grooving contact with a rotating work piece, the blade is of a type having its teeth so spaced and arranged that each tooth is spaced 90° from another tooth. The body of the tool has first and second parallel clamping surfaces through which a straight slot opens. A first or front clamping member has a hub on which a blade is rotatably mounted and which fits the slot and is held thereby against turning. The two clamping members are connected by a threaded member by which the clamping members are drawn towards each other to clamp the blade against the first clamping surface. The slot is disposed and dimensioned so that, in use, it is normal to the axis of the work piece with one end above and the other end below that axis. A member threaded through the body extends into the upper end of the slot and is operable to move the hub lengthwise of the slot enabling the position of a selected tooth relative to the work piece to be precisely established. When more than one blade is mounted on the hub, the blades are held apart by a spacer. The front of the tool has a series of graduations having a central marker spaced from the periphery of the blade and 90° from the no rake position of the tooth selected for cutting or grooving rotating work. The marker divides the graduations into two groups, one group reflecting a positive rake position and the other, a negative rake position.

6 Claims, 3 Drawing Sheets

TOOL HOLDING CIRCULAR TOOTHED BLADES STATIONARY WHILE CUTTING OR GROOVING ROTATING WORK

BACKGROUND OF THE INVENTION

It has long been the practise to employ in machine tools of which lathes are but one example, rotatable members having a peripheral series of uniformly spaced elements each of which is to be brought into contact with a rotating work piece while the member is held against turning.

Each element of a member may be capable of performing a function differing from that performed by the other elements of that member or the elements may all be of the same type with each for use when the element in contact with the work piece is no longer fit for further service.

In either case, such members required indexing means and usually readjusting controls in order to effect the positioning of the selected element for proper engagement with the work piece.

THE PRESENT INVENTION

The general objective of the present invention is to provide a tool to be held in a machine tool with at least one circular blade, such as a circular saw blade or a milling cutter, clamped thereto against turning when a selected tooth is brought into cutting or grooving contact with a rotating work piece.

In accordance with the invention, this objective is attained with a tool having a body provided with backing surfaces in the center of which there is a socket. A first or front clamping member has a hub which is shaped and dimensioned to extend through the central aperture of such a blade both to slidably support it and permit it to be turned and also to extend into the socket. The socket and hub are shaped and dimensioned so that, when the hub is entered in the socket, it is held against turning while the clamping member is being forced by a rotating connection with the tool into a position clamping the blade, supported by the hub, against the backing surface.

Circular saw blades are available in a substantial range of diameters and thicknesses. Their teeth are usually hollow ground providing a configuration suitable for grooving as well as cutting off lengths of rotating work pieces. When larger work is involved, milling cutters are used and these have their teeth wider than the body of the blade but relieved in all directions from their cutting edges.

One of the features of the invention is that substantial areas of the blades are rigidly supported when clamped against the backing surface of the tool and since blade diameters vary, clamping members of diameters appropriate for the different blade sizes are used. Where a clamping member approaches the diameter of the blade, it is cut away adjacent the position of a tooth to be used in order to accommodate the work piece being severed. While conventional blades are well adapted for use, if chip clearance is a problem, blades with increased spacing between their teeth overcome that difficulty.

An important feature of a tool body having a socket opening through its backing surfaces to receive and hold the blade supporting hub against turning, is that with a socket of appropriate depth and a hub of corresponding axial extent, more than one blade can be mounted thereon. When more than one blade is to be used at the same time, spacers separate them. A set of spacers, differing from each other in thickness enable short and even thin sections to be accurately cut.

Another objective of the invention is to make possible the precise positioning of the selected tooth or teeth when the tool is secured to a tool holder. Before the blade or blades are so clamped against the backing surface as to prevent their turning, the blade or blades are manually turned to bring them as close as possible to their correct position. To ensure precise positioning, the socket in the backing surface is a diametrically extending slot in which the hub is a slideable fit and moveable in either radial direction, moving the clamping member and any blade mounted on the hub with it. The slot extends in directions normal to the axis of associated rotating work with one end above and the other end below that axis. With adjusting means threaded radially through the body of the tool into releasable engagement with the hub, the hub can readily be moved to effect the precision positioning of the selected tooth or teeth by turning the adjusting member in one direction or the other.

A further objective of the invention is to provide hub adjusting means requiring but a single threaded adjusting member. For that purpose, the hub of the clamping member has an undercut, lengthwise slot, preferably T-shaped in cross section with the narrow part of the slot opening towards the threaded member. The end of the threaded member is formed with a head dimensioned to be a sliding fit in the wider part of the undercut slot and a neck or narrower portion of a diameter such that it is a sliding fit in the narrower part of the slot. The hub thus can be detachably connected to the threaded adjusting member when the hub is entrant of the diametrically disposed slot and the head of the threaded member is in alignment with the wider part of the undercut slot. In practise, the diametrically disposed slot is of sufficient length to enable positive and negative rake positions also to be precisely established by the same means.

Yet another objective of the invention is to enable the detachable connection between the hub and the adjusting member to be easily made as each time a blade is changed, that connection is released as the clamping member is detached from the body. To that end, the tool body has a second parallel backing surface through which the diametrical slot opens a second clamping member is provided to overlie the second or rear backing surface and the two clamping members are detachably interconnected by a threaded member extending axially through one clamping member, the slot and threaded into the other clamping member and operable to effect the clamping of the blade or blades between the first clamping member and the first backing surface. Before the slot extending through the body is closed by the second clamping member, both the hub and the adjusting means are visible enabling their interconnection to be easily made.

A further objective of the invention is to enable the precise position of a selected tooth relative to the center line of rotating work to be easily and conveniently determined by reference to another tooth.

In accordance with my U.S. Pat. No. 5,044,838, a tool body having a shank extending away from the work in a direction normal to the axis thereof is provided with graduations which a tooth spaced 180° from the selected tooth overlies and which represent no rake and positive or negative rake positions of the selected tooth by the position of the overlying tooth relative to the graduations.

In accordance with this invention, determinations of no rake and positive or negative positions of the selected tooth are rendered more convenient for the user by marking such graduations on a front portion of the tool in a manner enabling the tooth spaced 90° from the selected tooth to be employed relative to such graduations to indicate the no rake, positive or negative rake position of the selected tooth.

Such a front portion of the tool may be that of the front of the body exposed beyond the path of the teeth or that portion may be the first or front clamping member. In the latter case, the tooth which is to overlie the graduations may have any desired angular relationship to the selected tooth although a 90° relationship is preferred.

Other objectives, novel features and advantages will be apparent from the accompanying drawings, the detailed description thereof and the appended claims.

BRIEF DESCRIPTION OF THE DRAWINGS

The accompanying drawings illustrate the presently preferred embodiments of the invention

THE PREFERRED EMBODIMENT

Figure 1:
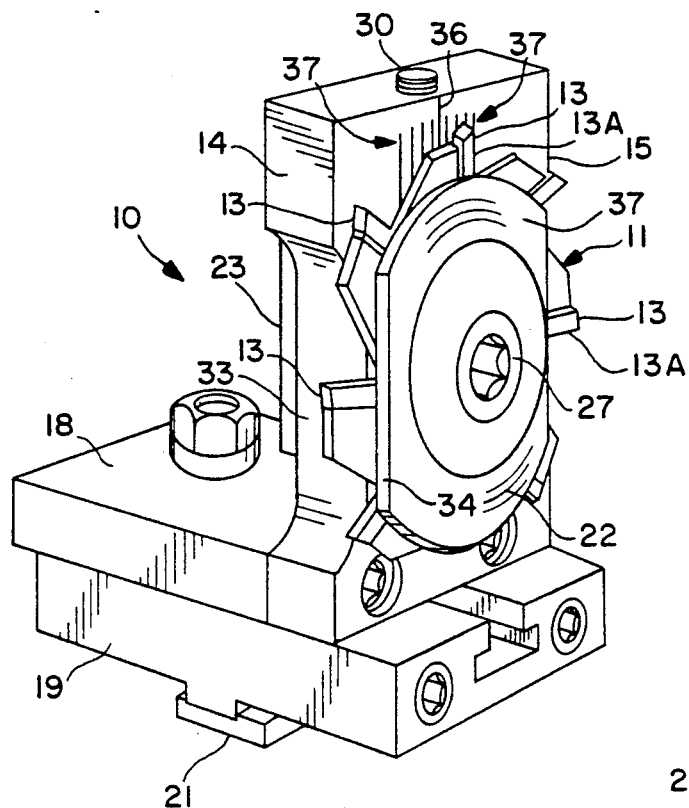
FIG. 1 is a front perspective view of the tool and a blade held thereby for cutting or grooving rotating work.
Figure 2:
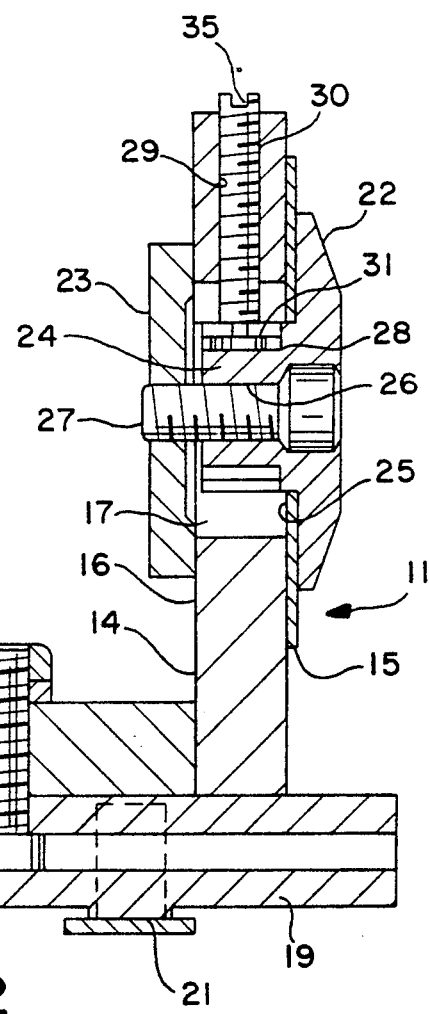
FIG. 2 is a vertical lengthwise section of the tool.
Figure 3:
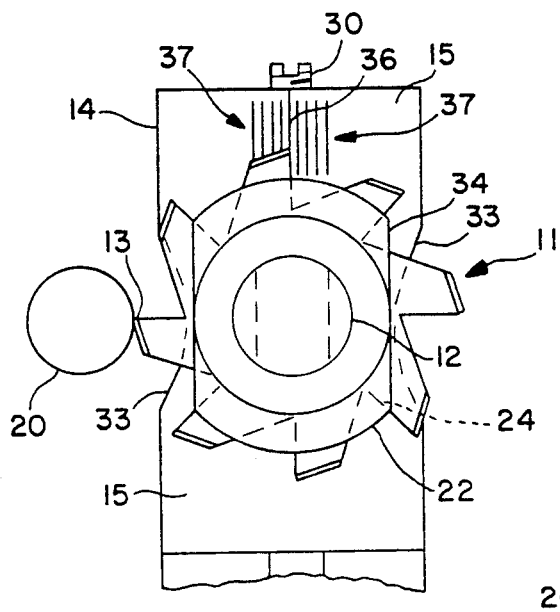
FIG. 3 is a front view of the tool with a selected tooth in a no rake contact with rotating work as represented by the position of a tooth spaced 90° therefrom relative to graduations with which the front of the body of the tool is provided.
Figure 4:
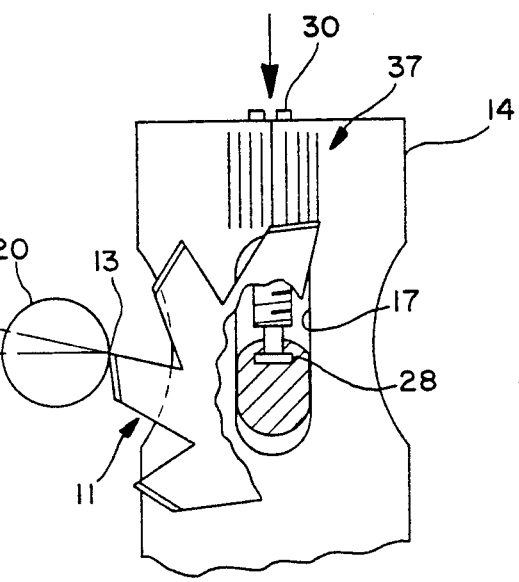
FIG. 4 is a view, similar to FIG. 3, but with the selected tooth set in a selected positive rake position.
Figure 5:
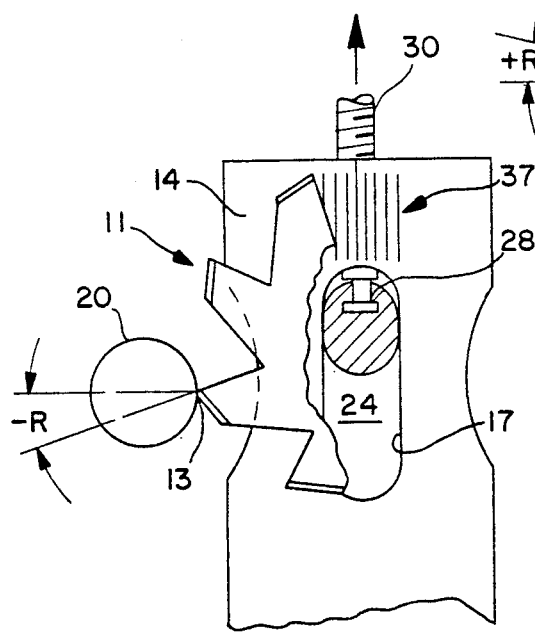
FIG. 5 is another like view with the selected tooth in a selected negative rake position.

The cutting and grooving tool illustrated by the drawings is generally indicated at 10 and is used to hold a toothed, circular saw blade, generally indicated at 11. The blade may be of any type having an axial aperture 12 and a circumferential series of teeth 13 characterized by each tooth being spaced 90° from another tooth. Preferably the blade 11 has teeth of the type shown in the drawings which are spaced a substantial distance apart and have leading, radial, exposed margins 13A.

The tool 10 has a body 14 provided with first and second parallel backing surfaces 15 and 16 and a straight central slot 17 opening through both backing surfaces and disposed normal to its flat shank 18. The shank 18 is shown in FIG. 1 as slidably connected to a tool holder mount 19 to permit the position of the tool to be adjusted lengthwise of the work piece 20 which is held by a conventional rotating chuck, not shown. The mount 19 is provided with a T-shaped guide 21 to enable the tool 10 to be moved towards or away from the work piece 20. When the tool 10 is positioned for use, it will be noted that the slot 17 is normal to the axis or center line of the work piece with its lower end below and its upper end above the center line.

The tool 10 is provided with first or front and second or rear clamping members 22 and 23, respectively. The first or front clamping member 22 has a central hub 24 protruding from its clamping face 25 and is shaped and dimensioned both to extend through and to so fit the blade aperture 12 as to rotatably support the blade 11 and to extend into and be a sliding fit in the slot 17. The first clamping member 22 is thus held against turning but is enabled to be shifted in the slot 17 in either direction.

An axial bore 26 extends through the first clamping member 22 and its hub 24 and is counter bored to accommodate the head of a cap screw 27 which extends freely through the bore 26 and is threaded through the second or rear clamping member 23 which is dimensioned to overlie the slot 17 and to be turned without contacting the shank 18 during assembly of the tool. The cap screw 27 is turned in one direction to clamp the two clamping members against their backing surfaces or to effect their release.

While the clamping pressure on the blade 11 can be such that the blade can be manually turned to bring a selected tooth 13 of the blade 11 into a correct position of use before the work piece 20 is rotated, correct positioning is not easily effected in that manner and such manually established positions are best to be considered as only approximate. To enable such an approximate position to be made a precise one, the hub 24 is provided with a lengthwise slot 28 open at its free end and T-shaped in cross section with its narrow, lengthwise opening disposed towards the upper end of the slot 17. The body 14 has a threaded bore 29 through its upper end, opening into the slot 17 in alignment with the center thereof and of the hub 24. An adjusting member 30 is threaded through the bore 29. To enable the adjusting member 30 to be detachably connected to the hub 24, the inner end of the adjusting member has a head 31 shaped and dimensioned to be a sliding fit in the bottom of the T-shaped slot 28 and an annular neck 32 dimensioned to be a sliding fit in the narrower part thereof. Such a connection is easily established when the hub 24, with a blade 11 supported thereby, is entered in the slot 17 and before the other end of the slot 17 is closed by the second or rear clamping member 23 as the position of the head of the adjusting member 30 can then be seen and easily adjusted to enable the hub 24 to be fully seated and the connection established.

It will be noted from the drawings that the dimensions of the clamping face of the first backing surface 15 and the size and shape of the first clamping member 22 are such as to rigidly support the blade 11 close to the teeth to effect its rigid support except where the sides of the body 14 are recessed as at 33 to accommodate the work piece 20 as it is being cut. Corresponding segments of the clamping member 22 are also removed for the same purpose so that its sides have straight edges 34. It will also be noted that the body 14 is so dimensioned as to provide an upper end portion of the first backing surface above the path of the blade teeth 13.

The outer end of the adjusting member 30 is shown as having a kerf 35 enabling the selected blade tooth to be precisely adjusted by using a screw driver relative to the center line of the work piece 20. Such a position may be a no rake position or one of positive rake or negative rake.

The upper end portion of the first backing surface is provided with a no rake marker 36 which is in a vertical plane inclusive of the center of the slot 17 and parallel to its sides. At each side of the central marker 36 there is a series of straight, parallel graduations 37, one indicating degrees of negative rake and the other indicating degrees of positive rake. The graduations are of substantial length as the blade is moved lengthwise of the slot as the position of the selected tooth is precisely established. With a blade of the preferred type, the straight, radial margin of its teeth make the wanted position of a selected tooth to be easily and accurately determined by reference to the position of the tooth spaced 90° therefrom and now having its straight radial margin reflecting the position of the selected tooth. It will be appreciated that by noting that position, it is easy, if the selected tooth becomes too worn for further use, to so relieve the clamping pressure as to permit the blade 11 to be turned and then to bring another tooth in the exact wanted position. The same practical advantage exists if a blade needs to be replaced.

Figure 6:
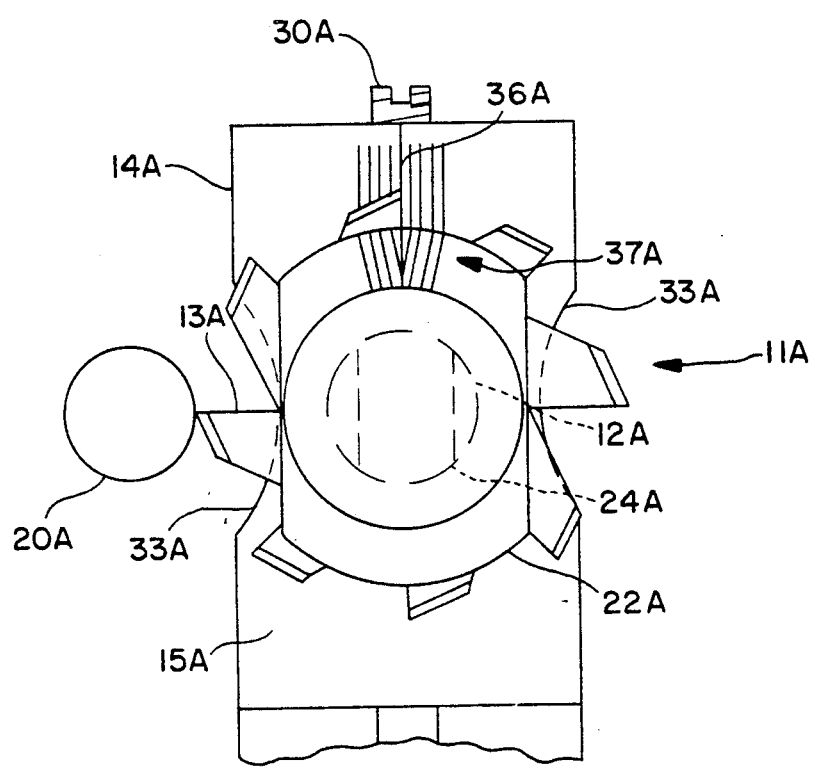
FIG. 6 is a view similar to FIG. 3 but with the first or front clamping member provided with the graduations.

The embodiment of the invention illustrated by FIG. 6 is or may be, except for the location of the graduations, substantially identical to the previously described embodiment and, accordingly it will not again be detailed in its entirety. Corresponding parts are identified by the same reference numerals which are distinguished by the suffix addition "A" with the exception of the first backing surface which is identified by the reference numeral 115.

In FIG. 6, the graduations are on the front of the first clamping member 22A with the central marker 36A thereof representing the no rake position of the selected tooth 13A of the blade 11A when a tooth spaced 90° therefrom registers with that marker. The other two series of graduations 37A represent degrees of negative and positive rake. As the clamping member 22A and the blade 11A move together lengthwise of the slot 17A during adjustments of the selected tooth relative to the work 20A, the graduations may be radial as shown making it easier to determine the exact relation of the selected tooth relative to the work.

From the foregoing, not only should the structural requirements of tools in accordance with the invention be apparent but also the manner of their uses.

I claim:

1. A tool for use with a tool holder mount in holding at least one toothed blade against turning when a selected tooth of the blade is in cutting or grooving contact with a rotating work piece, the blade having an axial aperture and the teeth of the blade so arranged and spaced about portions of the periphery that each tooth is spaced 90° from another tooth, said tool including a body having a shank connectable to the holder mount, said body having portions with first and second parallel backing surfaces and a socket in the form of a straight slot having parallel sides and opening through both surfaces and said slot being normal to the center line of the work when the body is connected to the holder mount, first and second clamping members, the first clamping member provided with a hub shaped and dimensioned to extend through the blade aperture and rotatably and slidably support the blade and also to extend into the slot with the slot then intersecting the blade axis, the hub having flat sides spaced apart for sliding engagement with the sides of the slot thereby to prevent the hub from turning, the first clamping member and the portion of the body having the first backing surface so dimensioned that the portion of the periphery of the blade including the selected tooth protrudes therefrom, at least at one side of the body, means detachably interconnecting the body and clamping members through the slot in a manner enabling the first clamping member with the blade supported by the hub to releasably clamp the blade against the first backing surface, the second clamping member then engageable with the second backing surface, the body provided with hub positioning means extending into an end of the slot and detachably connected to the hub when in the slot and operable to shift the hub lengthwise of the slot to enable the selected tooth to be precisely positioned relative to the center line of the work after the blade has been manually turned to place the selected tooth in approximately its position for use and before the blade is clamped in place and the tool including a portion provided with a series of graduations having a central marker spaced from the periphery of the blade and in a plane midway between and parallel to the sides of the slot, said marker dividing the series of graduations into two groups, the cutting edge of one of the teeth spaced 90° from the selected tooth positioned relative to the marker or to one of the graduations of one of the groups to indicate no rake, positive rake or negative rake position.

2. The tool of claim 1 in which the first clamping member and the portion of the body having the first backing surface so dimensioned that the portions of the blade protrude from both sides thereof, one such blade portion including the selected tooth.

3. The tool of claim 1 in which the portion of the tool having the series of graduations is part of the front of the body and is outside a path of the teeth of the blade.

4. The tool of claim 3 in which the graduations are straight and parallel and of sufficient length to be exposed in any position of the blade lengthwise of the slot.

5. The tool of claim 1 in which the portion of the tool having the series of graduations is the first clamping member.

6. The tool of claim 5 in which the graduations are radial.

* * * * *